(12) United States Patent
Kiefer et al.

(10) Patent No.: US 8,316,690 B1
(45) Date of Patent: *Nov. 27, 2012

(54) HYPERVELOCITY IMPACT AND TIME OF ARRIVAL DETECTION METHOD AND SYSTEM

(75) Inventors: Karl F. Kiefer, Conroe, TX (US); Doug Heerman, Conroe, TX (US); Brian Philpot, Conroe, TX (US); Christopher DePalm, Conroe, TX (US); Gulnara Roberson, Conroe, TX (US); Eric Krug, Conroe, TX (US)

(73) Assignee: Invocon, Inc., Conroe, TX (US)

( * ) Notice: Subject to any disclaimer, the term of this patent is extended or adjusted under 35 U.S.C. 154(b) by 488 days.

This patent is subject to a terminal disclaimer.

(21) Appl. No.: 12/705,975

(22) Filed: Feb. 15, 2010

Related U.S. Application Data

(63) Continuation-in-part of application No. 12/614,413, filed on Nov. 7, 2009, which is a continuation-in-part of application No. 12/383,062, filed on Mar. 18, 2009.

(60) Provisional application No. 61/152,255, filed on Feb. 13, 2009, provisional application No. 61/112,190, filed on Nov. 7, 2008, provisional application No. 61/037,704, filed on Mar. 18, 2008.

(51) Int. Cl.
*G01M 7/00* (2006.01)

(52) U.S. Cl. ..................................... 73/12.01
(58) Field of Classification Search ....... 73/12.01–12.14
See application file for complete search history.

(56) References Cited

U.S. PATENT DOCUMENTS

| | | | | |
|---|---|---|---|---|
| 3,678,495 | A * | 7/1972 | Gilbert | 340/323 R |
| 4,856,318 | A * | 8/1989 | Hogan et al. | 73/12.13 |
| 5,280,751 | A * | 1/1994 | Muirhead et al. | 102/210 |
| 7,916,128 | B2 * | 3/2011 | Paradiso et al. | 345/177 |

* cited by examiner

*Primary Examiner* — Max Noori
(74) *Attorney, Agent, or Firm* — Kenneth A. Roddy

(57) ABSTRACT

A method and system for detecting hypervelocity impacts on a detection surface utilizes multiple sensors that directly measure electrical pulse radio frequency (RF) emissions generated by hypervelocity impacts on a detection surface and time of arrival (TOA) position measurements for determining the precise impact location on the detection surface. The detection surface material is compressed differentially in such a way that the inherent equalization of the compressed electron density in one area of the impact is directed to the uncompressed area of the material causing an electrical current that flows until the redistribution of the electrical charge has been completed and the rapid redistribution of charge and inherent current that results emits the radio frequency pulse that is induced into the detection surface.

8 Claims, 3 Drawing Sheets

HYPERVELOCITY IMPACT AND TIME OF ARRIVAL DETECTION METHOD AND SYSTEM

CROSS REFERENCE TO RELATED APPLICATIONS

This application claims priority of U.S. Provisional Application Ser. No. 61/152,255, filed Feb. 13, 2009 the pendency of which is extended until February 15 under 35 U.S.C. 119 (e)(3), and is a Continuation-In-Part of and claims priority of Non-provisional U.S. patent application Ser. No. 12/614,413, filed Nov. 7, 2009 claiming priority of provisional application 61/112,190 filed Nov. 7, 2008, which is a Continuation-In-Part and claims priority of Non-provisional U.S. patent application Ser. No. 12/383,062, filed Mar. 18, 2009, which claimed priority of U.S. Provisional Application Ser. No. 61/037,704, filed Mar. 18, 2008. Each of these identified prior applications is hereby incorporated by reference in its entirety.

BACKGROUND OF THE INVENTION

1. Field of the Invention

This invention relates generally to methods and systems for determining the impact point and damage propagation in a detection surface, and more particularly to a hypervelocity impact detection method and system that utilizes multiple sensors that directly measure electrical pulse emissions generated by hypervelocity impacts on a gridless detection surface and time of arrival (TOA) position measurements for determining the precise impact location in the detection surface.

2. Background Art

Continuous damage detection and characterization for various structures has been an elusive goal due to the transitory nature of the detectable high-frequency signals. A variety of techniques for detecting damage exist for detecting damage on aircraft, manned spacecraft, ships and underwater vehicles, motorized vehicles, storage tanks, pressure vessels, and civil structures. These techniques generally require the use of large numbers of sensor channels to be distributed throughout the structure to be monitored. Further, these sensors must be monitored continuously for transient signals that are indicative of damage, such as cracking, delamination, and impact. However, the size, complexity, and power consumption of the necessary electronics to acquire, process, and store the resulting digital waveforms is often too large to be included in operational vehicles or structures.

Various techniques have been used to monitor vehicles and structures for impact with micrometeoroids and orbital debris (MMOD) or other shock events in the past. Many involve the high-speed data acquisition and processing of large numbers of individual sensors, which are all wired back to a central location. Although these systems may be capable of detecting impact events, the vehicle resources required for the systems, such as power, mass, and volume, have been excessive.

Most impact and lethality assessment systems and methods for determining the impact point and damage propagation in a detection surface, such as ballistic missile intercepts, micrometeoroids and orbital debris (MMOD) or other shock events typically utilize a grid based lethality detection system in which a wire grid forms a mesh over the surface of the target missile nosecone and wire breaks within that grid are detected upon impact to provide an assessment of the impact point and subsequent damage propagation.

Frequency Domain Reflectometry (FDR) is a signal processing technique that encompasses several technical applications. The basic principle of FDR is the use of FM ranging to determine the distance to a reflective object. Examples include Frequency Modulated Continuous Wave (FMCW) RADAR and distance to fault (DTF) measurements in communications cables. DTF measurements are applicable to any cable installation that is obscured or inaccessible for manual or visual inspections or that could contain invisible faults suffered due to material aging, corrosion, or exposure. Examples of common uses are aircraft wiring harnesses and remote transceiver sites such as cellular telephone towers. Time Domain Reflectometry (TDR) is another technique used to measure cable faults. FDR is differentiated from TDR by the use of a frequency sweep as the interrogation signal rather than a high frequency impulse as used in TDR systems.

Prosser, et al, U.S. Pat. No. 6,628,567 discloses an acoustic monitoring device having at least two acoustic sensors with a triggering mechanism and a multiplexing circuit. After the occurrence of a triggering event at a sensor, the multiplexing circuit allows a recording component to record acoustic emissions at adjacent sensors. The acoustic monitoring device is attached to a solid medium to detect the occurrence of damage.

Devices for acquiring high-speed transient signals, for example acoustic emissions, typically require data acquisition electronics that are in a high-power mode for acquiring data on at least one channel at the full data acquisition rate. The power consumption of these high-speed data acquisition electronics is significantly high. To determine if the acquired data is a transitory event of interest, a digital circuit must process the acquired digital data in some way, which requires a significant amount of power and processor resources. Acquired data must be stored in digital memory temporarily while the data is processed, such that if a transient event of interest is detected, the acquired data can be obtained. Continuously storing data to memory requires a significant amount of power.

Continuous damage detection and characterization for various structures has been an elusive goal due to the transitory nature of the detectable high-frequency signals. A variety of techniques for detecting damage exist for using piezoelectric transducers to detect damage on aircraft, manned spacecraft, ships and underwater vehicles, motorized vehicles, storage tanks, pressure vessels, and civil structures. These techniques generally require the use of large numbers of piezoelectric sensor channels to be distributed throughout the structure to be monitored. Further, these sensors must be monitored continuously for transient signals that are indicative of damage, such as cracking, delamination, and impact. However, the size, complexity, and power consumption of the necessary electronics to acquire, process, and store the resulting digital waveforms is often too large to be included in operational vehicles or structures.

Various techniques have been used to monitor vehicles and structures for impact with micrometeoroids and orbital debris (MMOD) or other shock events in the past. Many involve the high-speed data acquisition and processing of large numbers of individual sensors, which are all wired back to a central location. Although capable of detecting impact events, the vehicle resources required for the systems such as power, mass, and volume, have been excessive.

SUMMARY OF THE INVENTION

The present hypervelocity impact detection and time-of arrival (TOA) method and system overcomes the aforementioned problems and is distinguished over grid based detection systems, acoustic detection systems, and frequency domain reflectometry detection systems, in that it utilizes a gridless "detection surface" construction rather than a wire "detection grid". The gridless detection surface is formed of a material capable of propagating radio frequency (RF) impact detection signals responsive to receiving hypervelocity impacts from objects. The present gridless detection surface may be an electronically conductive surface, at least two noncontiguous surfaces joined to allow electrical coupling between the surfaces, an inner conductor layer in which the detection signals will propagate sandwiched between two dielectric layers with conductive ground planes connected at an edge of the detection surface, or combinations thereof.

The present hypervelocity impact detection and time of arrival (TOA) method and system utilizes multiple sensors that directly measure electrical pulse emissions generated by hypervelocity impacts on the detection surface, such as ballistic missile intercepts, micrometeoroids and orbital debris (MMOD) or other shock events, and time of arrival (TOA) position measurements for determining the precise impact location in the detection surface. The detection surface material is compressed differentially in such a way that the inherent equalization of the compressed electron density in one area of the impact is directed to the uncompressed area of the material and thus an electrical current flows until the redistribution of the electrical charge has been completed. This rapid redistribution of charge and the inherent current that results emits a radio frequency pulse that is induced into the conductive detection surface as well as radiated into the atmosphere. The present method and system provides significant size, cost, and performance improvements over conventional systems.

DESCRIPTION OF THE PREFERRED EMBODIMENTS

Figure 1:
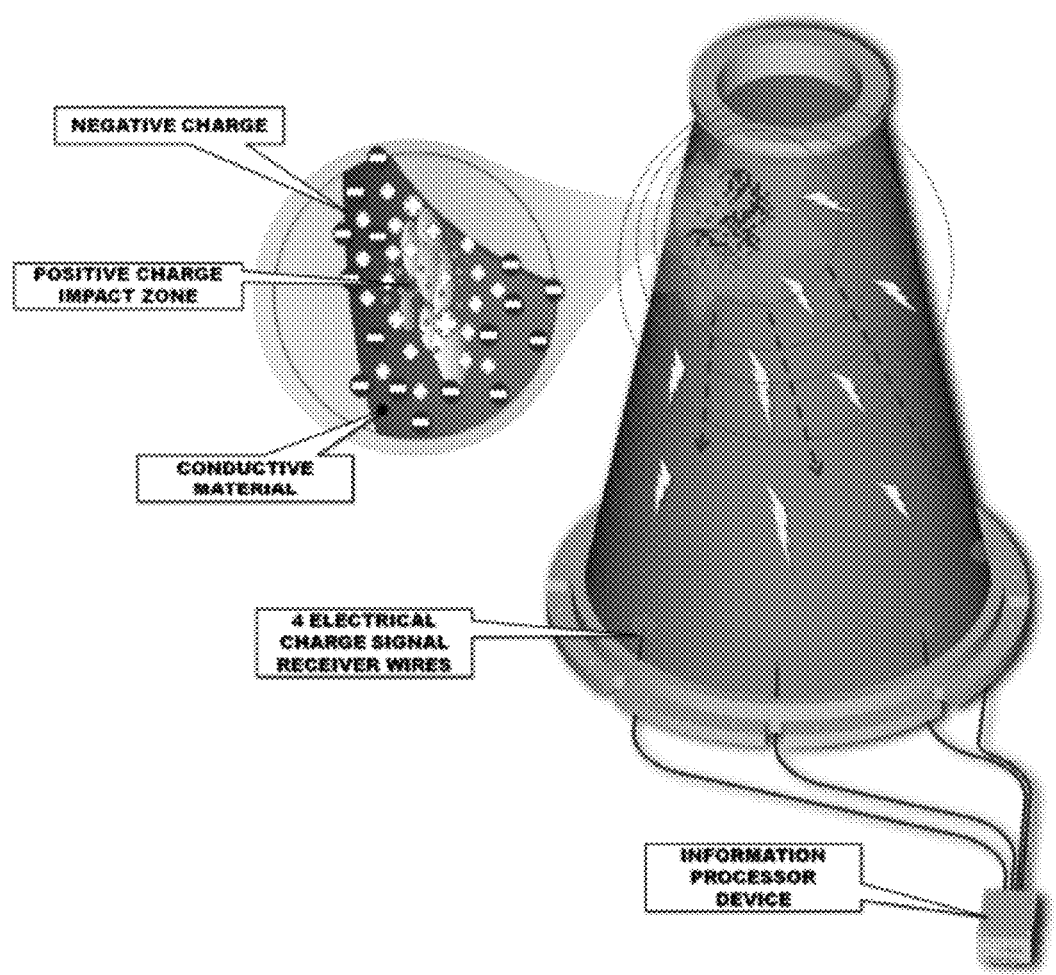
FIG. 1 is a schematic illustration of a physical configuration of an example of a detection surface that may be used to implement the hypervelocity impact detection method and system and method of the present invention.

Based on data released by the Air Force Research Laboratory (AFRL) from impact testing performed in hypervelocity test chambers, hypervelocity impacts have been shown to generate detectable RF emissions. We have conducted tests at the NASA hypervelocity impact facility at Las Cruces, N. Mex. which has provided data on the frequency content and magnitude of such RF pulses If these RF emissions were to be sensed from multiple geometric locations on the breached surface the precise impact location could be determined by measuring the difference in Time of Arrival (TOA) of the generated signals. The measurement of this very small difference in TOA requires precise electronic timing to detect. For example, a path difference of 1 m corresponds to only 3.33 nanoseconds. Achieving centimeter position resolution requires picosecond timing accuracy. The present hypervelocity impact detection method and system provides a processing technique and system that allows the measurement of these very small TOA differences with commercially available electronic components Detection Surface FIG. 1a illustrates, schematically, a physical configuration of an example of a gridless detection surface that may be used to implement the hypervelocity impact detection and time of arrival (TOA) system and method of the present invention. At this point we will use the term "detection surface" to differentiate the present gridless type of construction from a "detection grid".

Unlike a "detection grid", in which a wire grid forms a mesh over the surface and wire breaks within that grid are detected upon impact, the present gridless "detection surface" may be an electronically conductive surface, at least two noncontiguous surfaces joined to allow electrical coupling between the surfaces, an inner conductor layer sandwiched between two dielectric layers with conductive ground planes connected at an edge of the detection surface, or combinations thereof. The material selection and thickness of the dielectric layers are critical to the surface design as they contribute to the frequency selectivity as well as the propagation velocity of signals in the surface. In the present system, the detection surface is constructed as described above and is provided with at least three pulse detection points.

When a hypervelocity impact takes place, the target material is compressed differentially in such a way so that the inherent equalization of the compressed electron density in one area of the impact is directed to the uncompressed area of the material and thus an electrical current flows until the redistribution of the electrical charge has been completed. This rapid redistribution of charge and the inherent current that results emits a radio frequency pulse that is induced into the conductive target surface as well as radiated into the atmosphere. These pulses are relatively high voltage (proportional to the size and velocity of the impact) and can be captured via conduction on the surface or radio frequency antennas within the range of the radiated signal. This pulse creation at the hypervelocity impact can be detected as it travels through the conductive surface of the target material— i.e. the skin of an aircraft, missile, or spacecraft.

The material of the detection surface functions similar to a piezoelectric plate wherein mechanical distortion of the material results in the formation of the charge across the material, and the detection point on the present detection surface is, in effect, similar to the connection of the center conductor of a coax cable to the surface. Each cable to a detection point is run back to a high-peed clock array. The clocks are running at the same speed and will stop (and be read out) when the pulse resulting from an impact is detected. The time of arrival at each of the detection points is used to calculate the location of the impact.

With at least three unique pulse detection points on the surface and clocks that can measure picoseconds resolution, the relative time of arrival of the pulses at the detection points can be used to compute the location of the impact much the same way as LORAN is used to compute the location of aircraft.

Detection and Logic System

Figure 2:
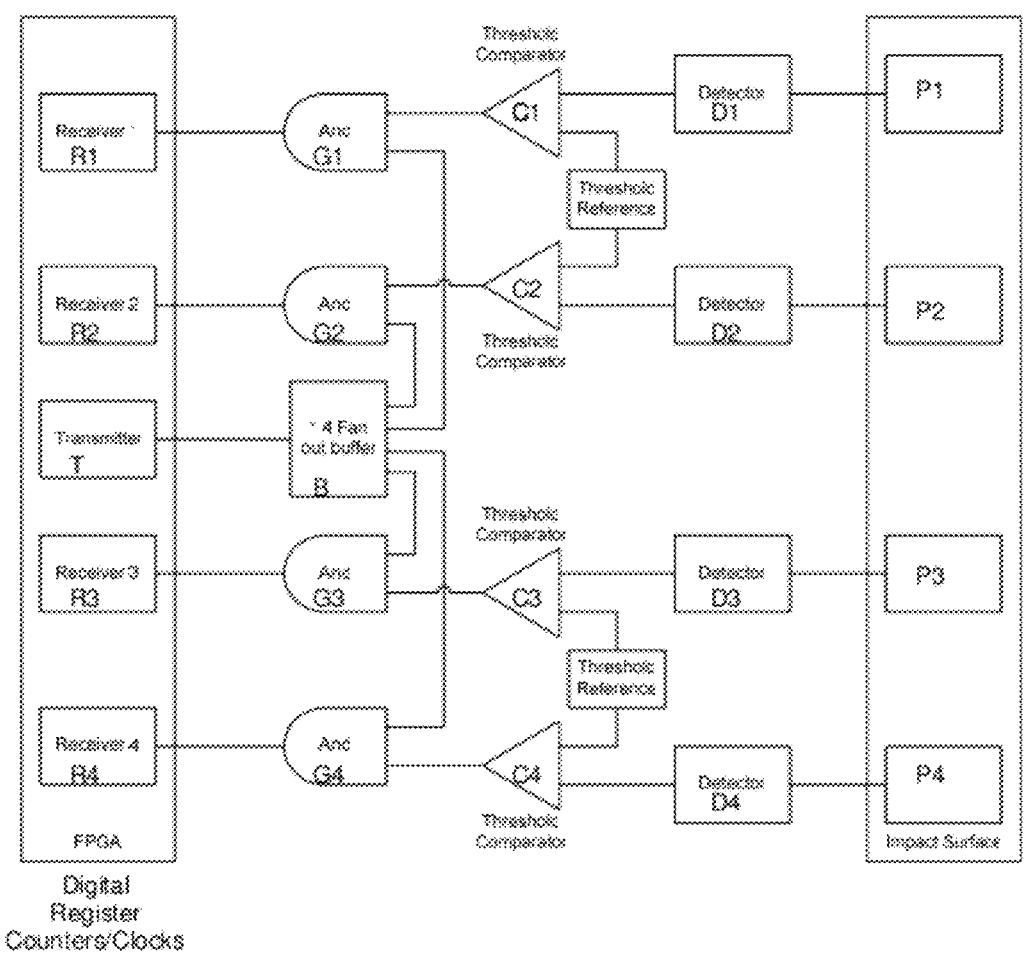
FIG. 2 is a schematic functional block diagram illustrating an example of a 4-channel system in accordance with the present invention.

Referring now to FIG. 2, there is shown a schematic functional block diagram illustrating an example of a four-channel detection and logic system in accordance with the present invention, however, it should be understood that the present system could contain one or more channels, and two or more of the hardware blocks could be combined into a single integrated circuit. The time of arrival (TOA) processing is a digital operation implemented in high speed programmable logic devices such a Field Programmable Gate Array (FPGA) and signal conditioning circuitry whereby the response (impact pulses) of all ports that occur as a result of impacts on the detection surface are measured by digital register counters or clocks of the FPGA via comparators and logic gates.

Each channel has an impact sensor or detector (D1, D2, D3, D4), which is interfaced with a respective detection point or detection port (P1, P2, P3, P4) and an input of a threshold comparator (C1, C2, CD3, C4), that accepts two signals as inputs. A first input of the comparator receives the output of the sensor or detector and a known threshold voltage is applied to the second input of the comparator. The output of each comparator (C1, C2, C3, C4) is interfaced with the input of a respective AND gate (G1, G2, G3, C4), and the second input of the gate receives a serial bit data stream from a fan out buffer B.

The output of the comparators (C1, C2, C3, C4) is either low or high, depending upon whether the first input signal (from the sensor or detector) is greater than second input signal (the threshold voltage) or not. In this way, as soon as the sensor output goes higher than the known threshold voltage, the output of the comparator will change, thereby causing the system to acquire a block of data. The threshold voltage may be either fixed or programmable and the value may be set with either analog or digital components.

A serial bit pattern transmitted by a transmitter T from the FPGA is replicated by the fan out buffer B to create four identical data streams. These data streams pass through respective individual high speed AND gates (G1, G2, G3, C4) that allow the data streams to be stopped at the precise time that an impact signal is detected via the corresponding port on the impact surface. These four identical data streams are received simultaneously by serial receivers (R1, R2, R3, R4) in the FPGA.

The detected impact signal at each surface port (P1, P2, P3, P4) is compared to a predetermined threshold. If the threshold is exceeded the comparator output causes the corresponding serial link to be stopped. The digital register counters or clocks of the FPGA measure the difference in time between stoppage of all the serial data streams. These time differentials can be used to triangulate the location of the impact event on the impact surface, as discussed below.

Preferably, all register clocks are located on the same FPGA so as to insure exact synchronization. The register counters or clocks are preferably capable of counting up at a rate of at least one binary count every 90 picoseconds, and in some applications, register clocks may be provided that are capable of counting up at a rate of at least one binary count every 250 picoseconds. The accuracy of pinpointing the impact locations varies with the speed of the clock registers.

In some applications, depending upon the type and strength of the impacts, the signal may be strong enough and the transmission distance short enough that a signal buffer will not be necessary.

It should be understood from the foregoing that when the impact pulse is detected at the sense point, the electrical charge is transferred to the clock comparators and the comparator logic stops the clock. Each clock stops at the time of arrival of the impact pulse at that sense point. The binary values in each of the clocks compared to the binary value in the first clock to stop specify the time of arrival, and that time is then used to triangulate the solution to the location of the impact pulse, as described below.

Source Triangulation

Figure 3:
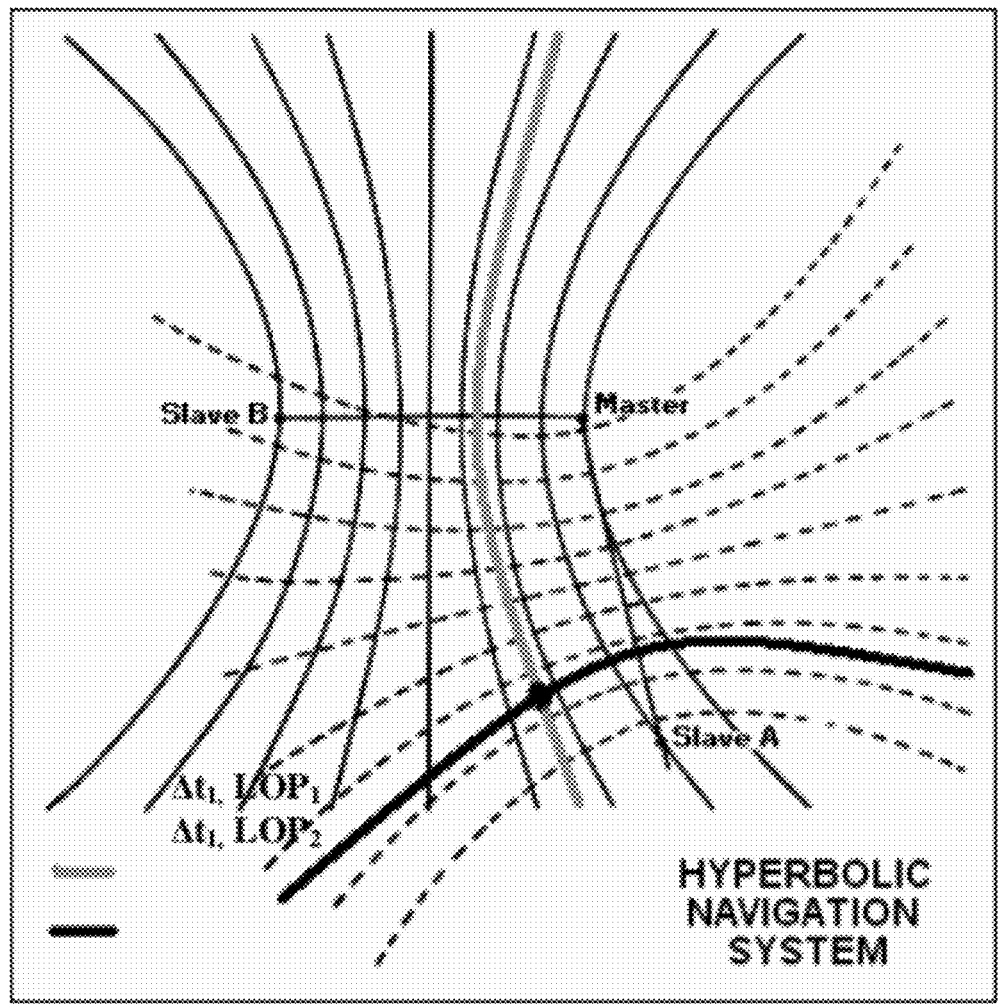
FIG. 3 is a diagram depicting how a hyperbolic navigation receiver determines its dimensional location based on measuring the Time Of Arrival (TOA) of signals from three transmitting sources.

FIG. 3 is a diagram depicting how impact site location is determined using a hyperbolic navigation approach and navigation receivers, similar to LORAN. LORAN determines its 2-dimensional location based on measuring the time of arrival (TOA) of signals from three transmitting sources. The time of arrival (TOA) differential between any two sources will result in a hyperbolic curve called a "line of position" (LOP). The receiver location can be accurately determined by the intersection of two or more of the LOP's. Time delay between two receivers $\Delta t_1$ determines a line of possible positions ($LOP_1$). Time delay between another pair of receivers $\Delta t_2$ fixes the site location as an intersection of $LOP_1$ with another hyperbolic line of possible positions ($LOP_2$). The present hypervelocity impact detection method and system uses a process similar to the LORAN process but with a single transmitter (the hypervelocity impact event) and multiple pulse detection points placed around the impact surface. Thus, the time of arrival (TOA) measurements made between the detection points will result in intersecting LOP's that uniquely identify the position of the impact.

Modern programmable logic devices have high speed transceivers capable of communicating data serially at speeds of up to 6.5 Gbits/s. Using one of these channels to transmit a known bit pattern to N receivers simultaneously in a loopback fashion provides N data links. Very small time differentials can be measured by counting bits received between discrete events which cause individual data links to be broken.

For example, given four data links sourced from one transmitter operating at 6.5 Gbits/s, a hypervelocity impact (HVI) event travels different distances in a detection surface to four geometrically spaced ports. The four data links are electronically stopped by trigger signals from the four detection ports at the times the signals arrive (TOA) at the ports. This system can measure time deltas between the four ports accurate to +/−154 picoseconds or +/−1 bit period of the 6.5 Gbit/s transmission. This corresponds to approximately +/−1.85 inches in spatial accuracy of the measurement. Furthermore, by utilizing redundant receiver hardware per port and analyzing the received signal versus an inverted version of itself (2 phases of the data signal) this measurement error can be cut in half. This would correspond to approximately +/−0.924 inches measurement accuracy.

While the present invention has been disclosed in various preferred forms, the specific embodiments thereof as disclosed and illustrated herein are considered as illustrative only of the principles of the invention and are not to be considered in a limiting sense in interpreting the claims. The claims are intended to include all novel and non-obvious combinations and sub-combinations of the various elements, features, functions, and/or properties disclosed herein. Variations in size, materials, shape, form, function and manner of operation, assembly and use, are deemed readily apparent and obvious to one skilled in the art from this disclosure, and all equivalent relationships to those illustrated in the drawings and described in the specification are intended to be encompassed in the following claims defining the present invention.

The invention claimed is:

1. A system for determining the impact point of a hypervelocity impact and damage propagation in a detection surface utilizing radio frequency (RF) emissions generated by the hypervelocity impact, comprising:
   a gridless detection surface comprised of a material capable of propagating radio frequency (RF) impact detection pulse signals responsive to receiving hypervelocity impacts from objects;
   a plurality pulse signal detectors coupled with said detection surface that capture radio frequency (RF) pulse signals generated by the hypervelocity impacts by conduction in said detection surface; and time of arrival (TOA) position measurement means coupled with said pulse signal detectors for determining the impact location in said detection surface.

2. The system according to claim 1, wherein said gridless detection surface is formed of at least one layer of material capable of being compressed differentially upon impact such that equalization of compressed electron density in one area of the impact is directed to an uncompressed area of the material and an electrical current flows until redistribution of the electrical charge has been completed such that redistribution of the electrical charge and current that results therefrom emits a radio frequency pulse that is induced into said detection surface.

3. The system according to claim 1, wherein said gridless detection surface is selected from the group consisting of an electronically conductive surface, at least two noncontiguous surfaces joined to allow electrical coupling between the surfaces, an inner conductor layer sandwiched between two dielectric layers with conductive ground planes connected at an edge of said detection surface, and combinations thereof.

4. The system according to claim 1, wherein said detection surface is an assembly of an inner conductor layer sandwiched between two dielectric layers with conductive ground planes connected at an edge of said detection surface, wherein radio frequency (RF) impact detection signals are propagated in said inner conductor layer responsive to said detection surface receiving a hypervelocity impact from an object.

5. The system according to claim 4, wherein said dielectric layers of said detection surface are formed of a material capable of being compressed differentially upon impact such that equalization of compressed electron density in one area of the impact is directed to an uncompressed area of the material and an electrical current flows until redistribution of the electrical charge has been completed such that redistribution of the electrical charge and current that results therefrom emits a radio frequency pulse that is induced into said detection surface.

6. The system according to claim 1, wherein said radio frequency (RF) impact detection pulse signals are captured by radio frequency antennas within the range of the radiated signal.

7. The system according to claim 1, wherein said time of arrival (TOA) position measurement means comprises:
high speed programmable digital logic devices and signal conditioning circuitry connected with said pulse signal detectors.

8. The system according to claim 7, wherein said high speed programmable digital logic devices and signal conditioning circuitry connected with said detection points comprise a Field Programmable Gate Array (FPGA) and signal conditioning circuitry whereby said impact pulse signals that occur as a result of impacts on the detection surface are measured by digital register counters or clocks of the FPGA via comparators and logic gates.

* * * * *